(12) United States Patent
Deng et al.

(10) Patent No.: US 11,891,248 B2
(45) Date of Patent: Feb. 6, 2024

(54) ARTICLE SUPPORT DEVICE AND ARTICLE LOADING AND UNLOADING SYSTEM

(71) Applicants: Tyco Electronics (Shanghai) Co. Ltd., Shanghai (CN); TE Connectivity Services GmbH, Schaffhausen (CH); Kunshan Sanxin Plastic Industry Co. Ltd, Kunshan (CN)

(72) Inventors: Yingcong Deng, Shanghai (CN); Ming Ni, Shanghai (CN); Lei Yang, Shanghai (CN); Dong Xu, Shanghai (CN); Dandan Zhang, Shanghai (CN); Fengchun Xie, Shanghai (CN); Huabin Du, Shanghai (CN); Roberto Francisco-Yi Lu, Bellevue, WA (US); Yangming Wen, Kunshan (CN); Ge Chen, Kunshan (CN)

(73) Assignees: Tyco Electronics (Shanghai) Co., Ltd., Shanghai (CN); TE Connectivity Solutions GmbH, Schaffhausen (CH); Kunshan Sanxin Plastic Industry Co., Ltd., Kunshan (CN)

( * ) Notice: Subject to any disclaimer, the term of this patent is extended or adjusted under 35 U.S.C. 154(b) by 604 days.

(21) Appl. No.: 17/096,191

(22) Filed: Nov. 12, 2020

(65) Prior Publication Data
US 2021/0147149 A1     May 20, 2021

(30) Foreign Application Priority Data
Nov. 14, 2019   (CN) .......................... 201911112537.6

(51) Int. Cl.
  *G06F 7/00*      (2006.01)
  *B65G 1/137*     (2006.01)
  *B65G 65/00*     (2006.01)

(52) U.S. Cl.
  CPC ......... *B65G 1/1375* (2013.01); *B65G 65/005* (2013.01)

(58) Field of Classification Search
  USPC .................................................. 700/213, 228
  See application file for complete search history.

(56) References Cited

U.S. PATENT DOCUMENTS

2005/0092890 A1\* 5/2005 Liao .................... B60R 11/0235
                                                                248/917

FOREIGN PATENT DOCUMENTS

| CN | 109334813 A | * | 2/2019 | ............. B62D 61/10 |
| CN | 109987123 A | * | 7/2019 | ............... B62B 3/02 |
| CN | 109987366 A | * | 7/2019 | |

OTHER PUBLICATIONS

K&L Shop Dolly https://www.amazon.com/Shop-Dolly/dp/B000WPWMV8/ref=sr_1_210?crid=2F65OOJP443X&keywords=two+piece+dolly&qid=1685578979&sprefix=two+piece+dolly%2Caps%2C90&sr=8-210 (Year: 2006).*

(Continued)

*Primary Examiner* — Yolanda R Cumbess
(74) *Attorney, Agent, or Firm* — Barley Snyder

(57) ABSTRACT

An article support device has a pair of support platforms arranged symmetrically and opposite to each other. Each of the support platforms includes a support frame, a support plate disposed on a top of the support frame and having a horizontal support top surface, and at least one positioning block installed on the horizontal support top surface. The horizontal support top surfaces of the support plates are located at a same height position. The article is supported on the horizontal support top surfaces and positioned between the positioning blocks on the support plates. An accommodation space is defined between the support plates and the support frames, and an automated guided vehicle moves into the accommodation space. An article carried on the article (Continued)

support device is loadable onto the automatic guided vehicle or the article carried on the automatic guided vehicle is unloadable onto the article support device.

20 Claims, 5 Drawing Sheets

(56) References Cited

OTHER PUBLICATIONS

Genubi Industry Rubber Curb, Black Heavy Duty Parking Blocks Parking Target with Yellow Refective Stripes, Wheel Stop Stoppers for Car, Truck, RV, Trailer, and Garage, 2 Pack Professional Grade (Amazon website) (Year: 2018).*

* cited by examiner

ARTICLE SUPPORT DEVICE AND ARTICLE LOADING AND UNLOADING SYSTEM

CROSS-REFERENCE TO RELATED APPLICATION

This application claims the benefit of the filing date under 35 U.S.C. § 119(a)-(d) of Chinese Patent Application No. 201911112537.6, filed on Nov. 14, 2019.

FIELD OF THE INVENTION

Embodiments of the disclosure relate to an article support device and, more particularly, to an article loading and unloading system of an article support device.

BACKGROUND

In existing storage systems, in order to improve efficiency of article handling, an automatic guided vehicle ("AGV") is usually employed to move articles. However, the automated guided vehicle cannot autonomously complete loading and unloading of the article, and a special loading and unloading device is thus required. For example, a forklift needs to be used to load the article onto the automated guided vehicle or to unload the article from the automated guided vehicle. The existing solution of such loading and unloading of the article is inefficient.

SUMMARY

An article support device has a pair of support platforms arranged symmetrically and opposite to each other. Each of the support platforms includes a support frame, a support plate disposed on a top of the support frame and having a horizontal support top surface, and at least one positioning block installed on the horizontal support top surface. The horizontal support top surfaces of the support plates are located at a same height position. The article is supported on the horizontal support top surfaces and positioned between the positioning blocks on the support plates. An accommodation space is defined between the support plates and the support frames, and an automated guided vehicle moves into the accommodation space. An article carried on the article support device is loadable onto the automatic guided vehicle or the article carried on the automatic guided vehicle is unloadable onto the article support device.

BRIEF DESCRIPTION OF THE DRAWINGS

The invention will now be described by way of example with reference to the accompanying Figures, of which.

DETAILED DESCRIPTION OF THE EMBODIMENTS

Figure 1:
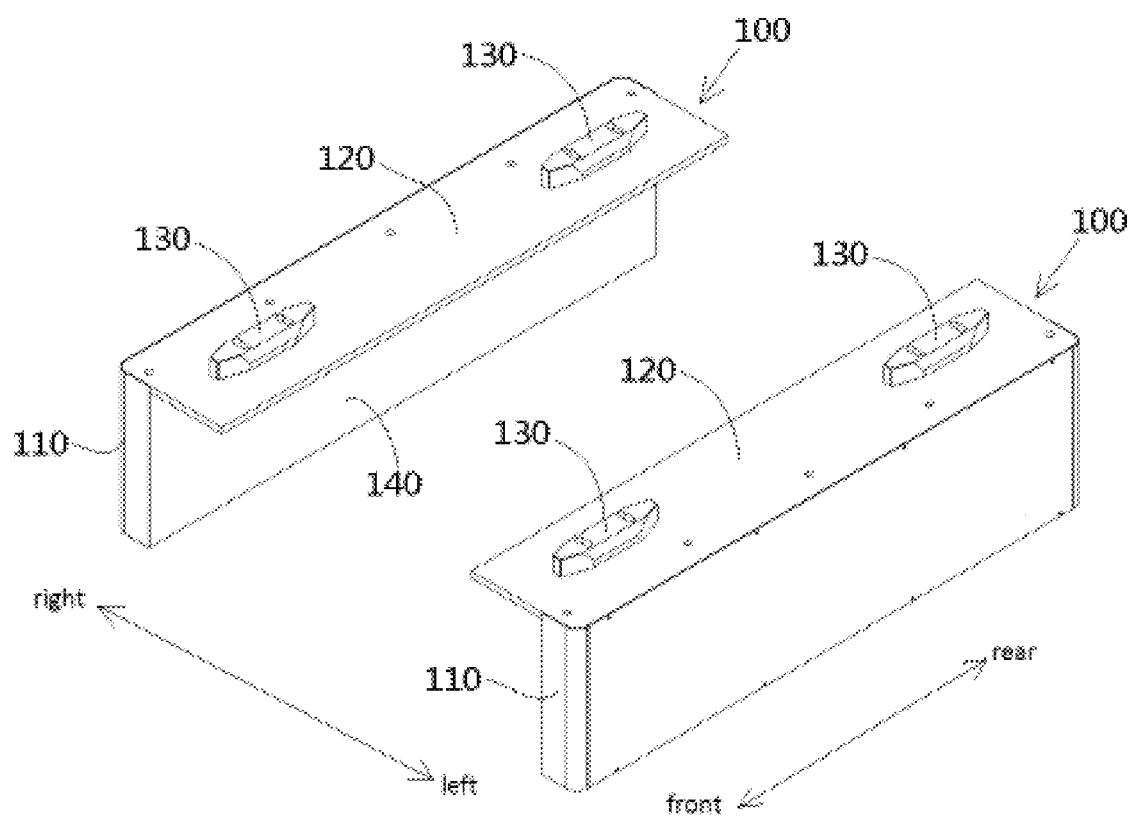
FIG. 1 is a perspective view of an article support device according to an embodiment.

Technical solutions of the disclosure will be described hereinafter in further detail with reference to the following embodiments, taken in conjunction with the accompanying drawings. In the description, the same or similar reference numerals indicate the same or similar parts. The description of the embodiments of the disclosure hereinafter with reference to the accompanying drawings is intended to explain the general inventive concept of the disclosure and should not be construed as a limitation on the disclosure.

In addition, in the following detailed description, for the sake of explanation, numerous specific details are set forth in order to provide a thorough understanding of the disclosed embodiments. It will be apparent, however, that one or more embodiments may also be practiced without these specific details. In other instances, well-known structures and devices are illustrated schematically in order to simplify the drawing.

An article support device according to an embodiment, as shown in FIGS. 1-4, is configured to assist an automated guided vehicle 200 to autonomously complete loading and unloading of an article 300. The article support device comprises a pair of support platforms 100 arranged symmetrically and opposite to each other.

Figure 2:
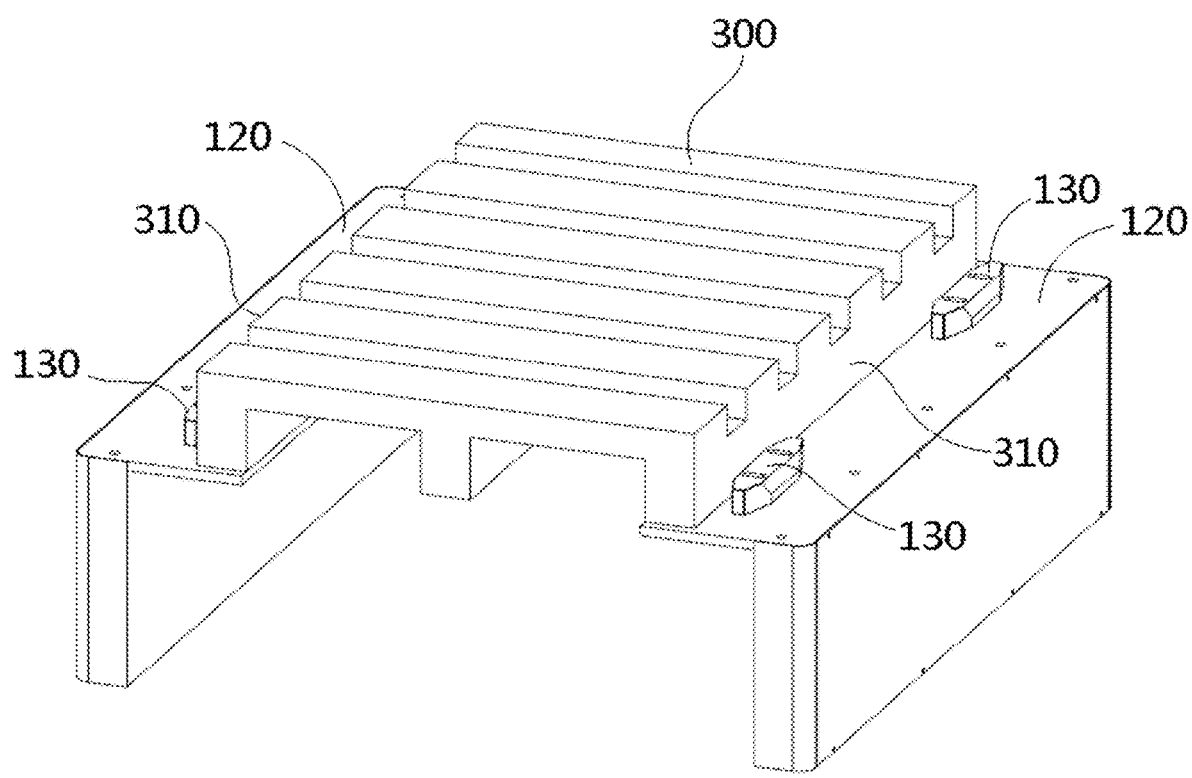
FIG. 2 is a perspective view of the article support device with an article supported on the article support device.

As shown in FIGS. 1 and 2, each of the support platforms 100 has a support frame 110, a support plate 120 installed on a top of the support frame 110 and having a horizontal support top surface, and at least one positioning block 130 installed on the horizontal support top surface of the support plate 120. In the shown embodiment, the horizontal support top surfaces of the two support plates 120 of the article support device are located at a same height position. The article 300 is suitable to be supported on horizontal support top surfaces of the two support plates 120 and positioned between the positioning blocks 130 of the two support plates 120.

Figure 4:
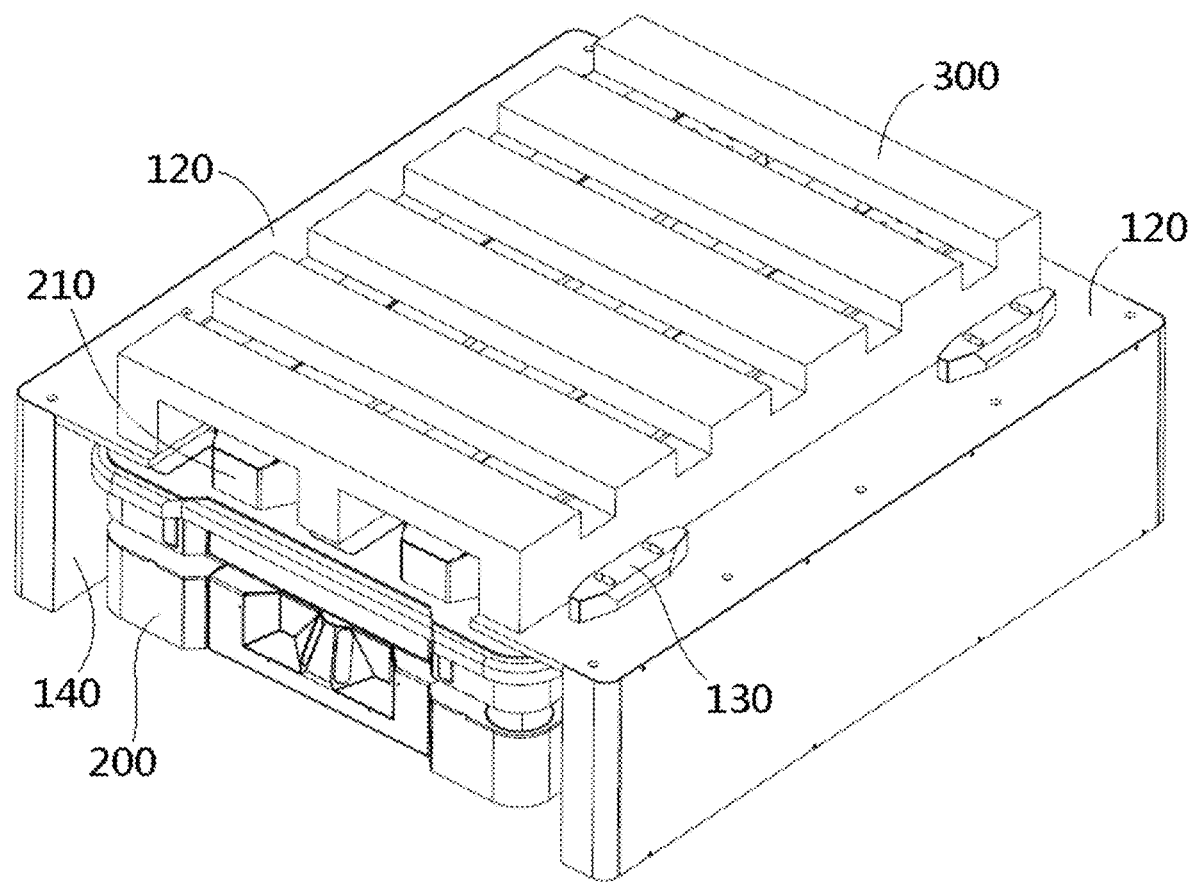
FIG. 4 is a perspective view of an automatic guided vehicle in an accommodation space of the article support device with the article.

As shown in FIGS. 1, 2 and 4, in the illustrated embodiment, an accommodation space is defined between the support plates 120 and the support frames 110 of the pair of support platforms 100. The automated guided vehicle 200 is adapted to move into the accommodation space to load the article 300, which has been loaded on the article support device, onto the automatic guided vehicle 200, or unload the article 300, which has been loaded on the automatic guided vehicle 200, onto the article support device.

As shown in FIGS. 1-4, in the illustrated embodiment, the two support plates 120 are opposed to and spaced apart from each other in a left-and-right direction. The positioning block 130 has two opposite sides in the left-and-right direction and two opposite ends in a front-and-back direction.

Figure 3:
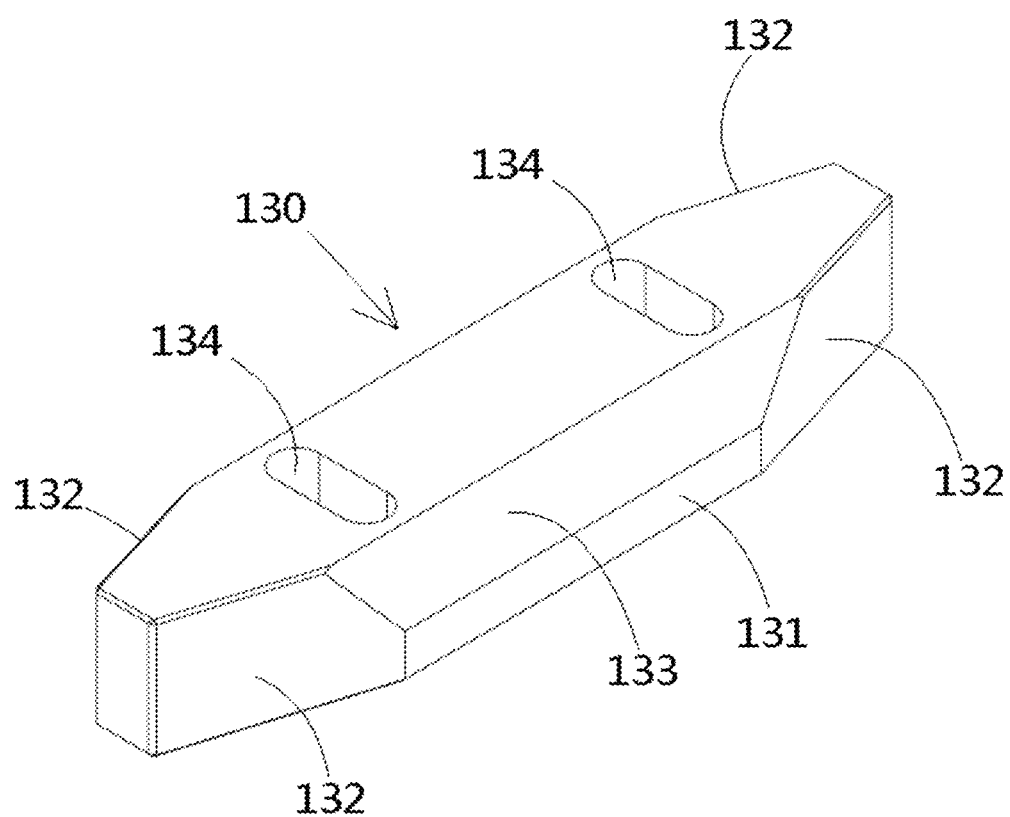
FIG. 3 is a perspective view of a positioning block of the article support device.

The positioning block 130, as shown in FIG. 3, has a vertical positioning side surface 131 on each of the sides thereof. The vertical positioning side surface 131 is adapted to contact with a side surface 310 of the article 300 so as to position the article 300 between the positioning blocks 130 of the two support plates 120.

As shown in FIG. 3, a first guide slant face 132 perpendicular to the horizontal support top surface is formed on each of two sides of each end of the positioning block 130, so that a width of each end of the positioning block 130 gradually decreases from its base to its tip. A horizontal flared mouth is defined between the two first guide slant faces 132, which are arranged to face each other, of the two positioning blocks 130 opposite to each other in the left-and-right direction to correctly guide the article 300, which is moved horizontally, into a space between the two positioning blocks 130.

As shown in FIGS. 1-4, in the illustrated embodiment, a second guide slant face 133, which is inclined with respect to the horizontal support top surface, is formed at an upper portion on each of sides of a middle part of the positioning block 130 and located above the positioning side surface 131. A width of the upper portion of the middle part of the positioning block 130 gradually increases downward from its top surface. A vertical flared mouth is defined between the two second guide slant faces 133, which is arranged to face each other, of the two positioning blocks 130 opposite to each other in the left-and-right direction so as to correctly guide the article 300, which is moved vertically, into the space between the two positioning blocks 130.

As shown in FIGS. 1-4, in the illustrated embodiment, the positioning block 130 is formed with a strip-shaped installation groove 134 extending in the left-and-right direction. The positioning block 130 may be fastened to the support plate 120 by a screw connection passing through the strip-shaped installation groove 130. The strip-shaped installation groove 134 extends by a predetermined length in the left-and-right direction, so that the positioning block 130 may move by a predetermined distance in the-left-and-right direction when the screw connection is loosened, so that a spacing distance between the positioning blocks 130 of the pair of support platforms 100 may be adjusted to match a size of the article 300.

As shown in FIGS. 1-4, in the illustrated embodiment, each of the support platforms 100 further comprises a positioning plate 140 installed on the support frame 110 and located inside the accommodation space. The positioning plate 140 has a vertical positioning surface perpendicular to the left-and-right direction. The automatic guided vehicle 200 is provided with a rangefinder adapted to detect a distance between the left and right sides of the automatic guided vehicle 200 and the positioning surfaces of the two positioning plates 140 disposed opposite to each other in the left-and-right direction, so that a position of the automatic guided vehicle 200 relative to the two positioning plates 140 can be identified or determined so as to correctly guide the automatic guided vehicle 200 into the accommodation space of the article support device.

As shown in FIGS. 1-4, in the illustrated embodiment, the support frame 110 is fixed on the ground or on a fixed base so that the entire article support device cannot be moved. However, it should be noted that the disclosure is not limited thereto, and the entire article support device may also be mobile.

Figure 5:
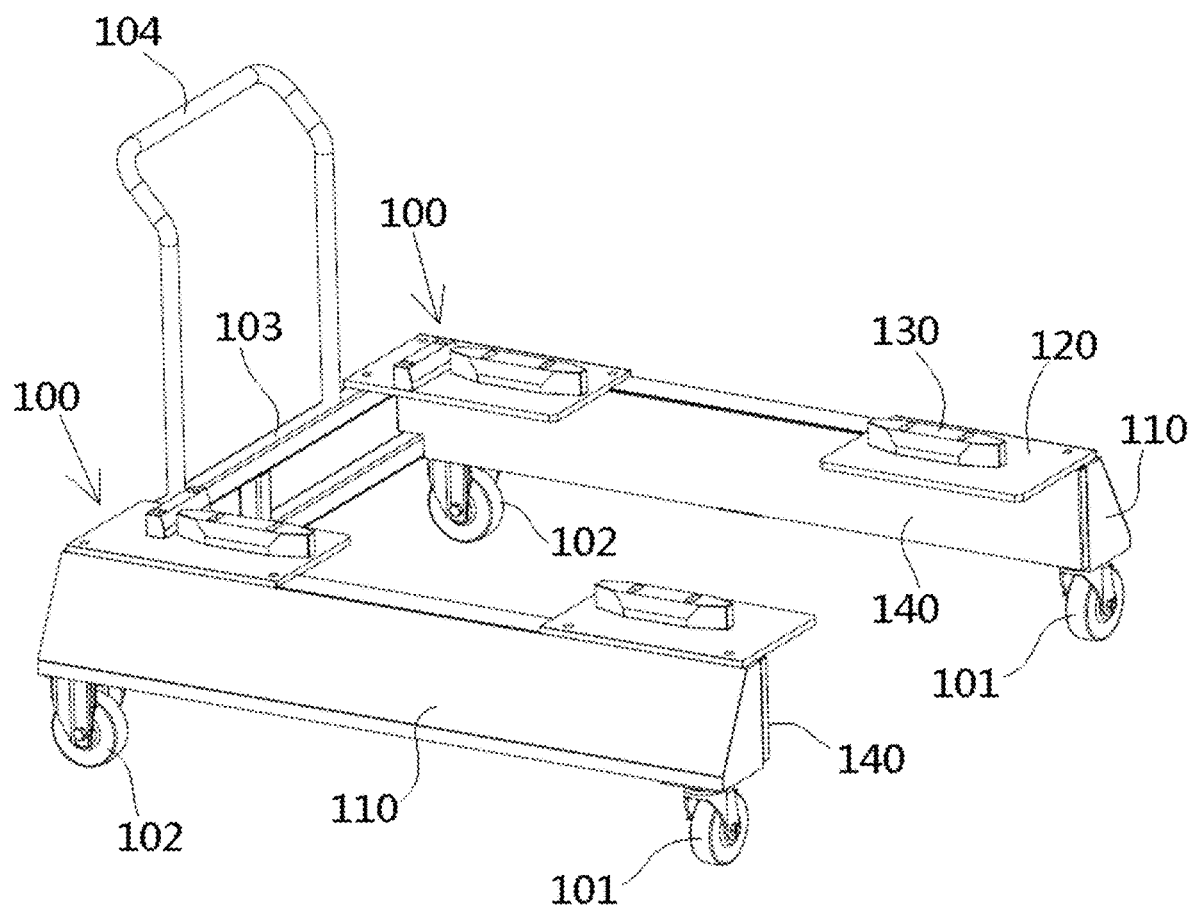
FIG. 5 is a perspective view of an article support device according to another embodiment.

An article support device according to another embodiment is shown in FIG. 5. Compared with the embodiment shown in FIGS. 1-4, the article support device shown in FIG. 5 is mobile. Differences of the article support device shown in FIG. 5 will be described in detail below.

As shown in FIG. 5, in the illustrated embodiment, the article support device further comprises a connection piece 103 connected between rear ends of the two support frames 110 and rollers 101, 102 installed at bottom portions of the two support frames 110. The entire article support device can be moved on the ground by the rollers 101 and 102. In the shown embodiment, the rollers 101, 102 include a pair of universal rollers 101 installed at bottom portions of front ends of the two support frames 110 and rotatable about a vertical axis and a horizontal axis, and a pair of fixed rollers 102 installed at bottom portions of the rear ends of the two support frames 110 and rotatable about the horizontal axis.

As shown in FIG. 5, in the illustrated embodiment, the article support device further comprises a handle 104 connected to the rear ends of the two support frames 110 such that the article support device can be driven to move on the ground by pushing or pulling the handle 104 by, for example, an operator or other tools.

As shown in FIG. 5, in the illustrated embodiment, each of the support platforms 100 comprises two positioning blocks 130, one of which is arranged on a top surface of the front end of the support plate 120, and the other of which is arranged on a top surface of the rear end of the support plate 120.

In another exemplary embodiment of the disclosure, an article loading and unloading system is also disclosed. As shown in FIGS. 1-5, the article loading and unloading system comprises an automatic guided vehicle 200 and an article support device according to one of the embodiments described above adapted to assist the automatic guided vehicle 200 to load and unload an article 300.

As shown in FIG. 4, the automated guided vehicle 200 is provided with a lifting device 210 movable up and down in a vertical direction, and the article 300 is adapted to be supported on the top of the lifting device 210. During loading the article 300, which has been carried on the article support device, onto the automated guided vehicle 200, the lifting device 210 moves upwardly to lift up the article 300 so that the article 300 is separated from the article support device and is supported on the lifting device 210. In this way, the article 300 loaded on the article support device may be loaded onto the automated guided vehicle 200. During unloading the article 300, which has been carried on the automated guided vehicle 200, onto the article support device, the lifting device 210 moves downwardly so as to place the article 300 onto the article support device. In this way, the article 300 carried on the automated guided vehicle 200 may be unloaded onto the article support device. In various exemplary embodiments of the disclosure as described, the article support device can assist the automated guided vehicle 200 to autonomously complete loading and unloading of the article 300, thereby improving the loading and unloading efficiency of the article 300.

In an exemplary embodiment of the disclosure, the automated guided vehicle 200 is provided with a rangefinder adapted to detect a position of the automated guided vehicle 200 relative to the article support device, so as to correctly guide the automated guided vehicle 200 into the accommodation space of the article support device.

It should be appreciated by those skilled in this art that the above embodiments are intended to be illustrative, and many modifications may be made to the above embodiments by those skilled in this art. Further, various structures described in various embodiments may be freely combined with each other without conflicting in configuration or principle.

Although the disclosure has been described hereinbefore in detail with reference to the attached drawings, it should be appreciated that the disclosed embodiments in the attached drawings are intended to illustrate the embodiments of the disclosure by way of example, and should not be construed as a limitation to the disclosure.

Although a few embodiments of the general inventive concept of the disclosure have been shown and described, it would be appreciated by those skilled in the art that changes or modifications may be made to these embodiments without departing from the principles and spirit of the general inventive concept, the scope of which is defined in claims and their equivalents.

It should be noted that, the word "comprise" or "comprising" doesn't exclude other elements or steps, and the word "a" or "an" doesn't exclude more than one. In addition, any reference numerals in the claims should not be interpreted as the limitation to the scope of the disclosure.

What is claimed is:

1. An article support device assisting an automated guided vehicle to autonomously load and unload an article, comprising:
   a pair of support platforms arranged symmetrically and opposite to each other, each of the support platforms including:
   a support frame;
   a support plate disposed on a top of the support frame and having a horizontal support top surface, the support plates opposed to and spaced apart from each other in a left-and-right direction; and
   at least one positioning block installed on the horizontal support top surface, including:
      a pair of opposite sides in the left-and-right direction and a pair of opposite ends in a front-and-back direction;
      a vertical positioning side surface on each of the pair of opposite sides, the vertical positioning side surface adapted to contact a side surface of the article so as to position the article between the positioning blocks on the support plates;
      a first guide slant face perpendicular to the horizontal support top surface formed at either side of each end of the positioning block; and
      a second guide slant face inclined with respect to the horizontal support top surface formed on an upper portion at either side of a middle part of the positioning block and located above the vertical positioning side surface, the upper portion of the middle part of the positioning block has a width gradually increasing downward from a top surface, a vertical flared mouth is defined between the second guide slant faces, arranged to face each other, of the two positioning blocks opposite to each other in the left-and-right direction, so as to correctly guide the article moved vertically into a space between the positioning blocks, the horizontal support top surfaces of the two support plates are located at a same height position, the support device adapted to support the article on the horizontal support top surfaces and positioned between the positioning blocks on the two support plates; and
   an accommodation space defined between the support plates and the support frames of the pair of support platforms, the accommodation space adapted such that as the automated guided vehicle moves into the accommodation space, the article carried on the article support device is loadable onto the automatic guided vehicle or the article carried on the automatic guided vehicle is unloadable onto the article support device.

2. The article support device of claim 1, wherein each end of the positioning block has a width gradually decreasing from a base to a tip.

3. The article support device of claim 2, wherein a horizontal flared mouth is defined between the first guide slant faces, which are arranged to face each other, of the positioning blocks opposite to each other in the left-and-right direction, so as to correctly guide the article moved horizontally into a space between the positioning blocks.

4. The article support device of claim 1, wherein a second guide slant face inclined with respect to the horizontal support top surface is formed on an upper portion at either side of a middle part of the positioning block and located above the vertical positioning side surface, the upper portion of the middle part of the positioning block has a width gradually increasing downward from a top surface.

5. The article support device of claim 4, wherein a vertical flared mouth is defined between the second guide slant faces, arranged to face each other, of the two positioning blocks opposite to each other in the left-and-right direction, so as to correctly guide the article moved vertically into a space between the positioning blocks.

6. The article support device of claim 1, wherein the positioning block has a strip-shaped installation groove extending in the left-and-right direction, the positioning block is fastenable to the support plate by a screw connection passing through the strip-shaped installation groove.

7. The article support device of claim 6, wherein the strip-shaped installation groove extends by a predetermined length in the left-and-right direction such that the positioning block is allowed to move by a predetermined distance in the-left-and-right direction when the screw connection is loosened, a spacing distance between the positioning blocks is adjustable to match a size of the article.

8. The article support device of claim 1, wherein each of the support platforms has a positioning plate installed on the support frame and located inside the accommodation space, the positioning plate having a vertical positioning surface perpendicular to the left-and-right direction.

9. The article support device of claim 1, wherein the support frame is fixed on a ground or on a fixed base so that the article support device is immovable.

10. The article support device of claim 1, further comprising a connection piece connected between rear ends of the support frames and a plurality of rollers installed at a bottom portion of each of the support frames, the article support device is movable by the rollers.

11. The article support device of claim 10, further comprising a handle connected to the rear ends of the support frames, the article support device is drivable to move on a ground by pushing or pulling the handle.

12. The article support device of claim 10, wherein the rollers include a pair of universal rollers installed at bottom portions of front ends of the support frames and rotatable about a vertical axis and a horizontal axis, and a pair of fixed rollers installed at bottom portions of the rear ends of the support frames and rotatable about a horizontal axis.

13. The article support device of claim 1, wherein each of the support platforms has a pair of positioning blocks, one of which is arranged on a top surface of a front end of the support plate and the other of which is arranged on the top surface of a rear end of the support plate.

14. An article loading and unloading system, comprising:
   an automatic guided vehicle having a rangefinder; and
   an article support device assisting the automated guided vehicle to autonomously load and unload an article, the article support device including:
      a pair of support platforms arranged symmetrically and opposite to each other, each of the support platforms having:
         a support frame;
         a support plate disposed on a top of the support frame and having a horizontal support top surface;
         at least one positioning block installed on the horizontal support top surface, the horizontal support top surfaces of the two support plates are located at a same height position, the article is supported on the horizontal support top surfaces and positioned between the positioning blocks on the two support plates; and a positioning plate installed on the support frame and located inside the accommodation space, the positioning plate having a vertical positioning surface perpendicular to a left-and-right direction; and an accommodation space defined between the support plates and the support frames of the pair of support platforms, the automated guided vehicle moves into the accommodation space, the article carried on the article support device is loadable onto the automatic guided vehicle or the article carried on the automatic guided vehicle is unloadable onto the article support device, the rangefinder of the automatic guided vehicle adapted to detect a distance between left and right sides of the automatic guided vehicle and the vertical positioning surfaces of the positioning plates located opposite to each other in the left-and-right direction to determine a position of the automatic guided vehicle relative to the positioning plates and correctly guide the automatic guided vehicle into the accommodation space.

15. The article loading and unloading system of claim 14, wherein the automated guided vehicle has a lifting device being movable up and down in a vertical direction and supporting the article thereon, the lifting device is configured, during loading the article carried on the article support device onto the automated guided vehicle, to move upwardly to lift the article such that the article is separated from the article support device and is supported on the lifting device, the lifting device is further configured, during unloading the article carried on the automated guided vehicle onto the article support device, to move downwardly to place the article onto the article support device.

16. An article support device assisting an automated guided vehicle to autonomously load and unload an article, comprising:
a pair of support platforms arranged symmetrically and opposite to each other, each of the support platforms including:
a support frame;
a support plate disposed on a top of the support frame and having a horizontal support top surface, the support plates opposed to and spaced apart from each other in a left-and-right direction; and
at least one positioning block installed on the horizontal support top surface, including:
a pair of opposite sides in the left-and-right direction and a pair of opposite ends in a front-and-back direction;
a vertical positioning side surface on each of the pair of opposite sides, the vertical positioning side surface adapted to contact a side surface of the article so as to position the article between the positioning blocks on the support plates; and
a first guide slant face perpendicular to the horizontal support top surface formed at either side of each end of the positioning block, each end of the positioning block has a width decreasing from a base to a tip in the front-and-back direction; and
an accommodation space defined between the support plates and the support frames of the pair of support platforms, the automated guided vehicle moves into the accommodation space, the article carried on the article support device is loadable onto the automatic guided vehicle or the article carried on the automatic guided vehicle is unloadable onto the article support device.

17. The article support device of claim 16, wherein each end of the positioning block has a maximum width decreasing between the base and the tip in the front-and-back direction.

18. The article support device of claim 16, wherein the width of the entire positioning block decreases between the base and the tip in the front-and-back direction.

19. The article support device of claim 16, wherein the first guide slant surfaces of the positioning blocks oppose one another in the left-and-right direction to define a horizontal flared mouth therebetween.

20. The article support device of claim 16, wherein each of the support platforms has a positioning plate installed on the support frame and located inside the accommodation space, the positioning plate having a vertical positioning surface perpendicular to the left-and-right direction.

* * * * *